United States Patent [19]
Eigenmann

[11] 3,894,791
[45] July 15, 1975

[54] REFLECTIVE MATERIAL FOR ROAD MARKING AND SIGNS

[76] Inventor: Ludwig Eigenmann, Vacallo, Canton Ticino, Switzerland

[22] Filed: Nov. 11, 1974

[21] Appl. No.: 522,933

Related U.S. Application Data

[63] Continuation of Ser. No. 323,929, Jan. 15, 1973, abandoned, which is a continuation of Ser. No. 135,945, April 21, 1971, abandoned.

[30] Foreign Application Priority Data

Apr. 22, 1970  Italy.................................. 23676/70

[52] U.S. Cl................................... 350/105; 404/14
[51] Int. Cl.²......................................... G02B 5/128
[58] Field of Search........ 350/104, 105, 106; 404/14

[56] References Cited
UNITED STATES PATENTS

| | | | |
|---|---|---|---|
| 3,030,870 | 4/1962 | Gill, Jr................................. | 350/105 |
| 3,036,928 | 5/1962 | Poole................................. | 350/105 |
| 3,288,618 | 11/1966 | De Vries............................. | 350/105 |
| 3,556,637 | 1/1971 | Palmquist.......................... | 350/105 |

*Primary Examiner*—John K. Corbin
*Attorney, Agent, or Firm*—Michael S. Striker

[57] ABSTRACT

The disclosure describes a reflective material consisting of a plurality of double focusing reflex-reflective elements, wherein each element comprises an uncoated transparent core sphere having a part exposed to impinging light, a plurality of at least partially coated minor spheres or spherical bowls, the coating having reflective properties, arranged about the not exposed part of said core sphere, and a transparent binder or matrix between said core and minor spheres or bowls, whereby light beams impinging on said exposed part are subject to multiple refractive and reflective phenomena to improve the optical response by the element at any direction of light impingement.

12 Claims, 11 Drawing Figures

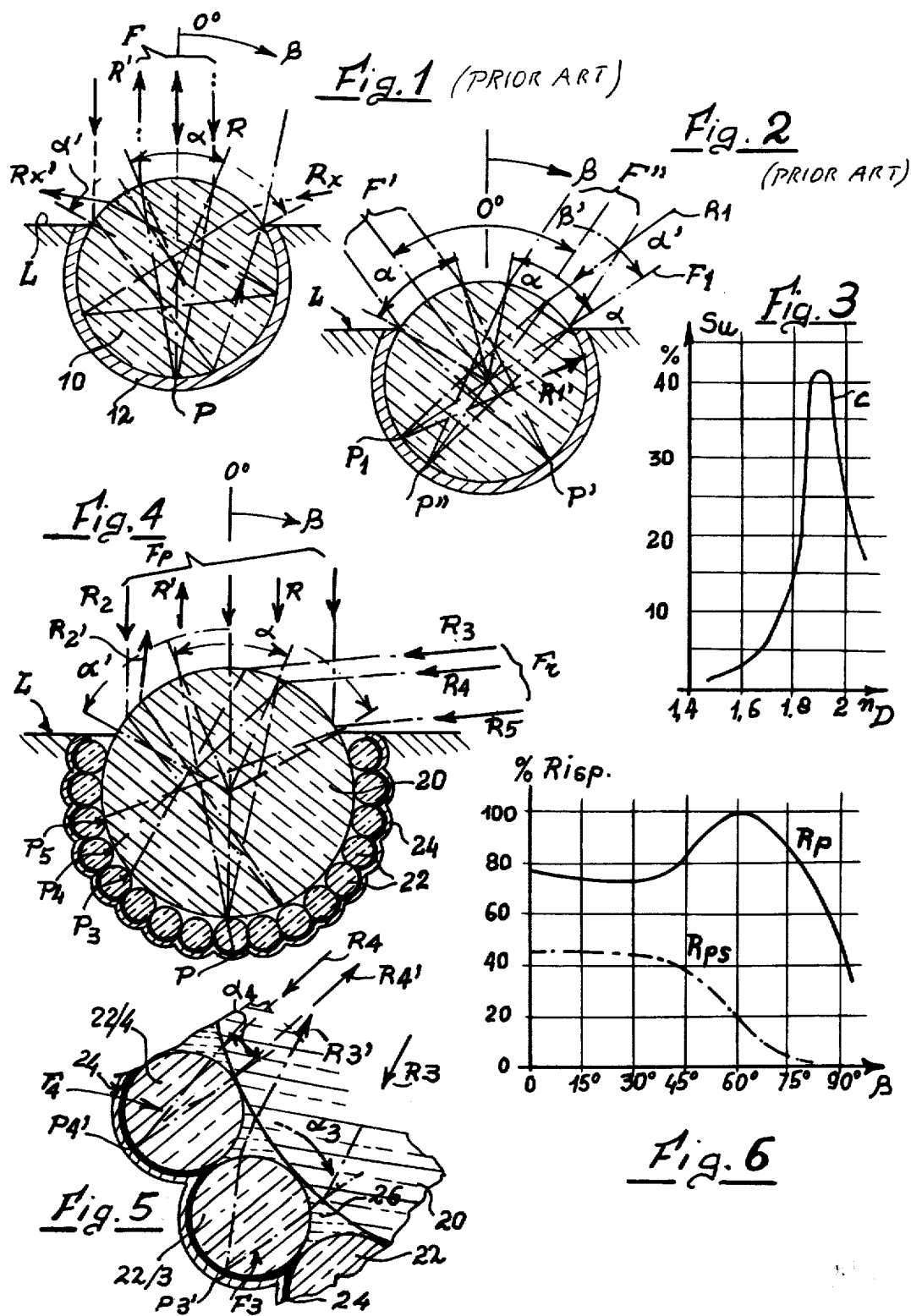

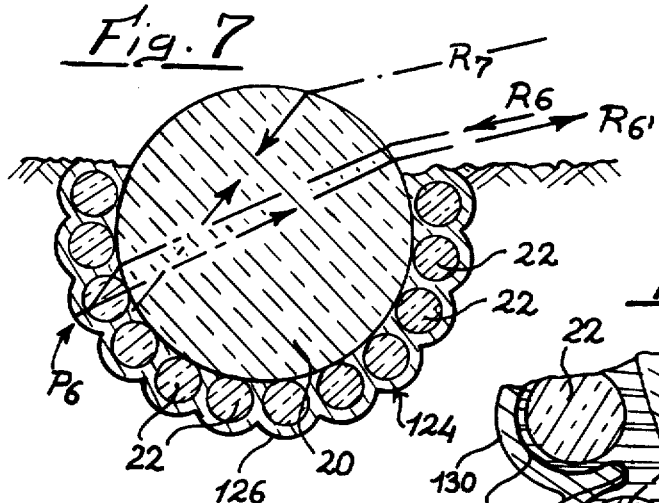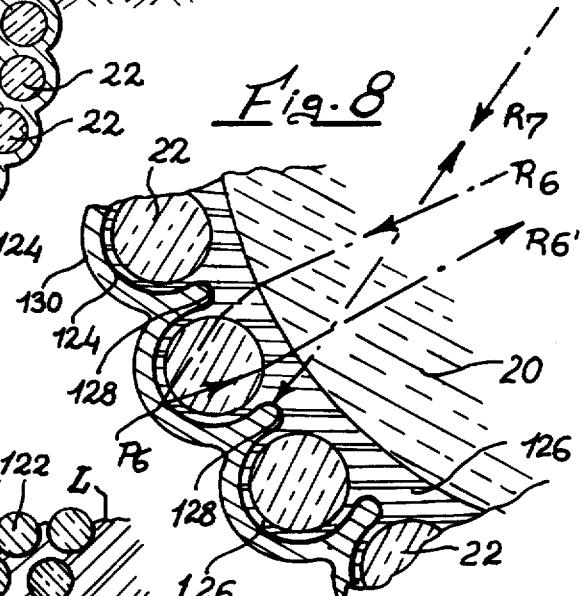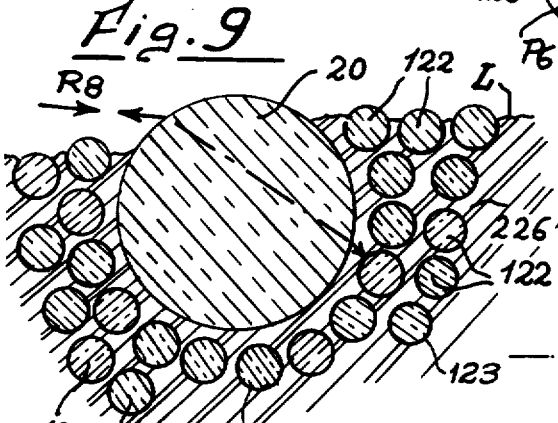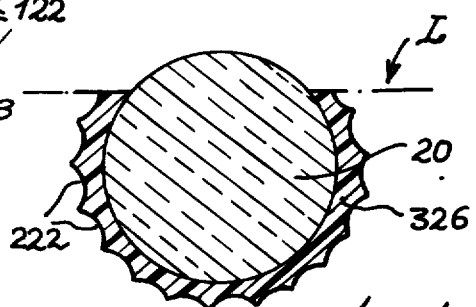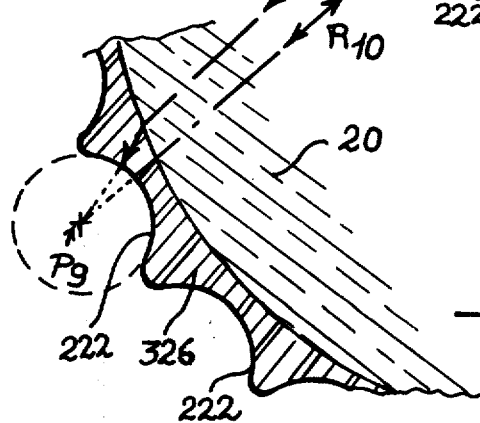

ers of application Ser. No. 135,945, filed Apr. 21, 1971, both how abandoned.
REFLECTIVE MATERIAL FOR ROAD MARKING AND SIGNS This is a continuation of application Ser. No. 323,929, filed Jan. 15, 1973, which, in turn, is a continuation of application Ser. No. 135,945, filed Apr. 21, 1971, both how abandoned.

BACKGROUND OF THE INVENTION

The invention relates to a new and improved material adapted to be made use of for imparting high brilliancy reflection to surfaces impinged by light, such as the surfaces of strips painted on or otherwise applied to roadway surfaces, or traffic regulating signs and other equivalent applications. More particularly, the invention relates to a reflective material of the type generally comprising a combination of transparent spheres or beads, such as glass spheres of suitable refractive index, and of reflective surfaces, such as silver or aluminum layers, the said combination forming a reflex-reflecting system consisting of lens elements (the spheres of transparent material) and of more or less specular reflectors (the reflective surfaces), the lens element focusing the impinging light beam on a spot of the adjacent reflective surface.

The art of such reflective material is a well worked one and an extensive comment thereabout is superfluous, while the essential structure, the mode of operation and the optical phenomena involved therewith will be briefly analyzed below, for better understanding of the features and advantages of this invention. Generally, such reflective elements, or spheres, coated with a more or less specularly reflective material, are incorporated or at least partially embedded into a suitable matrix, which may consist of a paint, or a binder or by the body of a roadmarking strip in tape form, or of a highly reflective conglomerate element wherein a great number of such spheres is incorporated in close relationship, so that a heterogeneous structure, having a generally planar surface, is formed. The spheres adjacent to said surface form spherical bowls projecting from said surface, exposed to the impinging light, and wherein the transparent body of the sphere is uncoated.

Said known reflective spherical materials are subject to several objections and limitations. For example: the exposed surface of the uncoated spherical bowl is in part only useful for properly reflecting the impinging light in a direction essentially parallel to that of impingement; the light beam can be properly focused only if glass of a well predetermined refractive index has been made use of for forming the spheres, and glasses having a refractive index greater than 1.8 and preferably than 1.9 are costly and not desirably resistent to weather; if the uncoated spherical bowl projects outside the generally planar surface of the structure for a height less than the radius of the sphere, light beams forming a substantial angle with the perpendicular to said surface cannot be reflected; when the exposed surface of the reflective structure is wetted such as by rain, the proper refractive index relationship between the sphere and the environmental medium is modified and the reflectivity is severely prejudiced.

It is, therefore, an object of this invention to provide a new and advantageous reflective material of the kind referred to above, which is so improved that the above and other objections and limitations are surprisingly eliminated or at least minimized.

SUMMARY OF THE INVENTION

According to the invention, the improved reflective material consists of reflex-reflective elements (which might be produced and made use of either in loose or in agglomerated form) each comprising a major core sphere of transparent material, such as glass, having a completely transparent surface, of given major radius, and a plurality of closely adjacent spherical bowls forming surfaces having reflective properties and each capable of focusing a light beam which has been refracted by and passed through the said core sphere, upon impingement of the uncoated and exposed spherical bowl thereof, said surface being of radius greatly lesser than said major radius and arranged about said core sphere except at said exposed bowl.

These and other objects and advantages of the invention, in particular the improvement provided thereby to the current art referred to above, will be made apparent as this description proceeds, by reference with the accompanying drawings, forming an essential component of this disclosure.

THE SEVERAL VIEWS OF THE DRAWINGS

FIG. 1 is an enlarged cross-sectional view of a prior art reflective material, when impinged by a light beam co-axial with its uncoated exposed bowl;

FIG. 2 is a like view of same known material, when impinged by light from a direction forming a substantial angle with the axis if the said bowl;

FIG. 3 is a graph illustrating the critically of the refractive index in view of the optical response of the prior art material;

FIG. 4 is an enlarged cross-sectional view of a first embodiment of the invention;

FIG. 5 is a greatly enlarged cross-section of a detail of FIG. 4;

FIG. 6 is a graph wherein the great and unexpected advantages of the umproved material of the invention, with respect to prior art, are illustrated;

FIG. 7 is an enlarged cross-section of a modification of the embodiment shown in FIGS. 4 and 5;

FIG. 8 is a greatly enlarged detail of FIG. 7;

FIG. 9 is an enlarged cross-section of another embodiment of the invention, in agglomerate form;

FIG. 10 is a enlarged cross-section of a further embodiment of the invention; and FIG. 11 is a greatly enlarged detail of FIG. 10.

DETAILED DESCRIPTION OF THE PREFERRED EMBODIMENTS

The concepts and the features of the invention will be best understood upon a brief analysis of the most recent and accepted art, such as illustrated in FIGS. 1 and 2. A known reflective element comprises, essentially, a glass sphere 10 of glass having a suitable refractive index, as discussed below, coated by a specularly reflective coating 12, except where exposed to the impinging light, such as above level L, which generally indicates the essentially planar surface of the heterogeneous material or structure, wherein the reflective elements are embedded. The axis of the uncoated spherical bowl is assumed to be vertical, and the sphere is assumed to project upward from level L for a height equal to one half of its radius. These are the most common average conditions of such reflective materials, when made use of for improving the nighttime visibility of markers laid on and secured to the surfaces of roadways.

A light beam F co-axial to the said axis, is assumed to impinge on a part, of given amplitude $\alpha$, of the exposed spherical bowl. Such beam will be focused at P and vertically reflected. The angular amplitude $\alpha$ of the spherical areas, on which an impinging beam must be confined for being properly focused and reflected, cannot be greater than 74°, as known to those skilled in the art, and the focusing of such a beam occurs only when the glass of sphere 10 has a refractive index of 1.92, assuming that the spherical bowl is contacted by air. For a greater or a lesser refractive index, the focus would not be located on the surface of the sphere, but inside or respectively outside said surface, and no proper reflection will occur, or at least the reflection will be effective only for light beams impinging on a spherical area of lesser angular amplitude (angle $\alpha$). This means that a small part and even a very small part of the total exposed area of the reflective sphere can be actually made use of for properly reflecting the impinging light.

The graph of FIG. 3 illustrates the criticality of the refractive index $n_D$ in terms of percentage of "useful area" $S_u$ wherein an impinging beam must be confined for being properly focused and reflected, the total available area being that of the exposed bowl of a sphere projecting for one half of its radius from a planar surface, such as indicated by level L in FIGS. 1 and 2, and other FIGURES which will be explained below. The curve C sharply peaks between the values 1.8 and 2.0 of refractive index, and has its peak at the value 1.92.

If the exposed part of the sphere does not directly contact air, but water (refractive index 1.33) the reflex-reflectiveness of the system drops, because the ratio of the refractive indexes of the adjacent media is modified. This is the typical case of road marker or other reflective signs when wetted by rain.

Referring now to FIG. 2, there is taken into account the actually common occurrence that the reflective element will be impinged by light beams from directions forming a substantial angle $\beta$ with the axis of the exposed spherical bowl of the sphere 10, such as the light beams F' and F''. The useful amplitude $\beta'$ of the cone containing the axis of light beams, passing through the center of the sphere, is not the angular amplitude of such bowl, which cannot be exploited for proper focusing and reflection of the light. Such useful amplitude is given by $$\beta' = \frac{\alpha' - \alpha}{2}$$

wherein $\alpha'$ is the said amplitude of the spherical bowl.

Such very undesirable limitation results from the concept of "single" or "simple" focusing, applied by current art. Such phenomenon provides for reflecting a ray in direction parallel to but symmetrically displaced at the other side of the axis of the beam. In FIG. 1, for example, there is shown a ray R reflected at R'. Thus, while any possible light ray included in the amplitude $\alpha$ of the inclined beams F' and F'' will be reflected, upon focusing at P' and respectively at P'', a more inclined beam having its axis at $F_1$, at the border of the exposed spherical bowl of sphere 10, will not be reflected. As a matter of fact, the rays below said axis at $F_1$ will not impinge the bowl, and the rays above said axis, such as ray $R_1$, upon focusing at $P_1$, will be reflected at $R_{1'}$, inside the concealed part of the sphere, and therefore uselessly.

In FIG. 1 the fate of an useless reflex-reflection is exemplified by the path of an impinging ray $R_x$, which will uselessly issue from the sphere in the undesired direction $R_{x'}$.

Principally, the invention provides for (a) unlimited exploitment of the available surface of the exposed bowl for catching and reflecting light, and (b) for unlimited angulation or inclination of the impinging light, for $\beta$ comprised from 0° to 90°.

A typical embodiment of the invention is shown in FIG. 4: a "double" focusing element comprises a core major sphere 20 and a plurality of smaller spheres 22 adjacent thereto, except at the exposed bowl of the sphere, above level L. Such smaller spheres 22 can be removed from bowl as being torn off by the roadway traffic, for example, or by brushing the outer face of the heterogeneous structure. Said smaller spheres 22 are permanently bonded to the core sphere 20 by transparent binder 26 (FIG. 5) of polymeric nature. The outer surfaces of the spheres 22 (that is the surfaces far from the core sphere 20) are made reflective by means of a suitable reflective coating 24, the actual reflective layer being indicated, in the several FIGURES, where shown, by a heavily drawn line. Each smaller sphere 22 and its reflective (or at least strongly diffusive) backing, provide for a localized focusing of any impinging beam which issues from the adjacent location of the core sphere.

The above indicated important advantages and effects can be briefly commented as follows:

a. — With regard to any light beam of amplitude $\alpha$, the device conventionally operates as above described, except to the fact that the beam will be focused twice. In the reflection of perpendicularly impinging light, however, all the light which impinges on the exposed bowl of the core sphere 20 will be reflected in same direction, and therefore, the usefully reflectable light beam can be of amplitude $F_{p'}$ that is spanning essentially on the entire area of the exposed bowl. In FIG. 4 there is shown a ray $R_2$ which upon multiple refraction and reflection, is finally reflected at $R_{2'}$.

b. — Light beams impinging on the exposed bowl at a very ample angle $\beta$ will be reflected even better than those perpendicularly impinging thereon. For example, a "grazing" light beam $F_r$ will be completely reflected in a direction very near to that of impingement. Its rays $R_3$, $R_4$ and $R_5$ will be refracted in the core sphere 20 to impinge at $P_3$ and respectively at $P_4$ and at $P_5$ and then focused by the adjacent smaller spheres 22. Each small sphere, individually, acts as an individual known reflective device.

The said localized secondary focusing, typical of this invention, can be better understood upon a consideration of the details of FIG. 5.

The localized focusing in smaller spheres 22/3 and 22/4, impinged by rays $R_3$ and respectively $R_4$ upon passage through the core sphere 20 (where they had been refracted) and the transparent binder 26, is indicated at $F_3$ and $F_4$. Of course, such focusing occurs within the admissible angular amplitudes $\alpha_3$ and $\alpha_4$ in the smaller spheres 22, and at locations $P_{3'}$ and $P_{4'}$. The rays are returned in the core sphere 20 in directions $R_{3'}$ and $R_{4'}$, nearly parallel and very closed to their incoming directions $R_3$ and $R_4$ (the smaller spheres 22 are actually very small) and finally reflected by the device in nearly the same positions and directions of impingement, upon their reverse refraction at the sphere-air interface.

It is advantageous that the core sphere 20 is made of a glass having a reasonably high refractive index, but, upon the provision of the secondary focusing, a more convenient lower index, such as of 1.5 to 1.7 is quite operable. Further, if the new material is to be made use of for imparting a brilliant reflectiveness to device or surfaces for marking of road surface, the importance of the reflection of grazing light beams is essential. These devices are designed to be impinged by light provided by vehicles headlamps and their visibility, at distance, results from grazing light at a nearly horizontal direction. This is the case of beam $F_r$ of FIG. 4, and in such an occurrence the function of the core sphere is simply that of downwardly deviating the light rays for directing the same on smaller spheres 22.

An important and unexpected advantage of the invention consists in that the above phenomena are substantially uneffected by the weather, in particular by rain which wets the exposed spherical bowls. A water layer over such bowl will modify the inclinations of the rays within the core sphere, such rays thus impinging smaller spheres 22 located above that impinged when the device is dry, all without modification of the final reflection to outside in a direction very near to that of initial impingement.

The most brilliant reflection is obviously obtained by using smaller spheres 22 of such refractive index to provide exact focusing at the reflective surface, such as at $P_{3'}$ and $P_{4'}$ (FIG. 5). This index should be of 1.92 relative to that of transparent binder 26. On the other hand, glasses of lower refractive index can be made use of provided that the reflective spherical surface is arranged at an interval from the surface of the glass spheroids. Such arrangement is examplified in FIGS. 7 and 8.

According to this embodiment of the invention, the smaller spheres 22 are completely coated by a layer 126 of transparent binder, so that the reflective stratum 124 is located where the focusing occurs. In said FIGS. 7 and 8 there is shown a ray $R_6$ focused at $P_6$ and the reflected as ray $R_{6'}$. Further, in providing an arrangement as shown, the transparent binder, when applied in liquid form, provide, between any pair of adjacent small spheres 22, a small meniscus 128 on which the reflective layer 124 is applied, before being covered by a protective coating or varnish 130 (FIG. 8). Each meniscus 128 provides a reflective spot, where further rays are reflected, such as ray $R_7$.

The optical equivalence between a lens and a reflective surface, having the curvature of the lens, can be also made use of, according to the invention. FIG. 9 illustrates a novel and advantageous embodiment of the invention, in the case that the structure is to be produced in form of an agglomerate comprising a number of relatively large spheres forming interspaces therebetween, a number of smaller spheres arranged in such interspaces, said large and smaller spheres being incorporated into a matrix of plastic material, the large and smaller spheres, adjacent to the outer surface of the agglomerate, partially projecting thereout for being impinged by light.

In the heterogeneous structure fragmentarily shown in FIG. 9, a large transparent and uncoated sphere 20 is partly embedded in a transparent polymeric matrix 226 together with a multiplicity of smaller spheres 122, which are completely coated with a reflective layer or film 123. Such coating is obviously removed or worn off by traffic where the smaller spheres 122 project outside the exposed surface of the agglomerate, such as above the level L.

This arrangement provides an extremely effective material for producing road surface markes therefrom. The spheres 122 are preferably made of glass having a refractive index from 1.80 to 1.95 and each partially uncovered small sphere 122 forms an individual reflex-reflecting element. The combination of any large sphere 20 and of the coated smaller spheres 122 adjacent thereto forms, at its turn, a double focusing system as above, well adapted for reflecting grazing light, as shown by ray $R_8$, for example. Such aggregate is adapted for producing road surface marker subject to severe traffic, because it maintains its properties even if the spheres are progressively stripped off by traffic, the combination and the relative arrangement of the large spheres, the smaller spheres and the matrix being maintained until an even thin layer of the material remains on the road surface.

The same concept of making use of reflective bowls can be also made use of according to the embodiment shown in FIGS. 10 and 11. A core transparent sphere 20, as above, is coated with a transparent polymeric material 326, to form a layer thereabout, and wherein a multiplicity of spherical bowls 222 are impressed and then coated with a reflective film or material. The focus of the reflective system, substitutive of the lens provided by each small sphere, as above, is located at the center of each individual reflective bowl.

As shown in FIG. 11, a ray $R_{10}$, refracted within the core sphere 20, behaves as if it was focused at $P_9$, alike a ray $R_9$ impinging on same reflective bowl, and reflected back in manner alike that described with relation to the preceeding embodiments of this invention.

The manner of providing a large or core sphere with a multiplicity of smaller spheres secured thereabout is well known in the art and does not form part of this invention. Similarly, it is well known how to provide a film or layer of reflective material, such as silver or aluminum, about a reflex-reflecting sphere or system of spheres. Therefore, such manner and the steps for manufacturing the material will not herein described.

A critical feature of the invention consists in the fact that a minimum ratio exists between the radii of the large or core spheres 20 and of the smaller spheres 22 or 122, or of the reflective bowls 222. Such ratio must be at least 5/1 and higher at will, within the limits of the availability of suitable glass spheres, up to 2000/1 for example, a ratio comprised between 10/1 and 100/1 being preferred.

The diameters of either large and smaller spheres can also widely vary, within the above limits of availability. For example, the diameter of the large spheres 20 is comprised between 10 mm. and 0.25 mm., and preferably from 2 mm. and 0.4 mm., and that of the smaller spheres 22 or 122 (or of the sphere to which the spherical bowls 222 appertain) is comprised between 2 mm. and 0.002 mm., and preferably from 0.2 and 0.02 mm.

Any polymeric material capable to ensure a firm and weather resistant bond between the glass sphere can be made use of to provide the transparent bond between the spheres or to form the matrix of the agglomerate of FIG. 9, or also the shaped coating of FIGS. 10 and 11, provided that it would be satisfyingly transparent and that preferably has a refractive index not higher than 1.7 and preferably than 1.5.

The most striking advantage of the invention is illustrated by the graph of FIG. 6. This graph illustrates the "optical response", in term of percentage (% Risp.) as a function of angle $\beta$ at which a light beam impinges on the exposed spherical bowl of a reflex-reflecting system. The highest response obtained has been assumed as 100%. The curve $R_{ps}$ indicates the response of one of the best material on trade, of the type described with reference to FIGS. 1 and 2, and the curve $R_p$ indicates that of a material according to the invention, namely to FIG. 4. Both the materials were made of glass spheres of exactly equal nature, quality and refractive index.

From the comparison of said curves $R_{ps}$ and $R_p$ it is evident that the improved material provides a striking higher optical reponse under the entire angulation of $\beta$ from 0° to 90°. At 90° the apparent brilliancy was still greater than that of the prior art material at its best conditions, that is at 0°. Further, it is evident that the response has a peak at 60°. This feature is extremely important for visibility at distance of a road marker, for example, secured to the roadway surface or forming part of a marking strip, for example, when impinged by the light of a vehicle headlamp.

It is evident that those skilled in the art can easily provide further equivalent embodiments of the invention, according to the various specific requirements of manufacture and/or use, and also that further improvements can be devised for best adaptation of the material for other applications wherein a brilliant reflectivity is desired.

It is therefore evident that such modification and further improved material and the resulting reflective means are well within the spirit and meaning of the invention and encompassed by the scope of the appended claims, together with any other equivalent structure, material and traffic aid which can be constructed from the approach and the teaching of same invention.

I claim:

1. A reflecting system, comprising at least one substantially transparent, substantially spherical element having a refractive index such that a beam impinging said element is refracted and at least partially focused regardless of the angle of impingement; a substantially transparent binding medium contacting and partially surrounding said element so that a portion of said element is exposed for impingement by beams and a portion of said element is surrounded by said binding medium; and reflecting means for the reflection of beams which pass through said element, said reflecting means consisting at least almost entirely of reflective, substantially part-spherical surfaces which are convex in relation to said element and which are secured about the periphery of said surrounded portion thereof by said binding medium, said reflective surfaces being spaced from said surrounded portion of said element by said binding medium and having their respective centers of curvature located substantially at the virtual foci of the beams which pass through said exposed portion of said element into the latter and then through said binding medium to said reflective surfaces so that such beams are at least partially focused once more and are reflected back to said element and out through said exposed portion along paths essentially coincident with their respective paths of impingement upon and travel through said element and said binding medium.

2. The reflecting system of claim 1, wherein said binding medium has a refractive index of at most about 1.5.

3. The reflecting system of claim 1, wherein the ratio of the radii of at least some of said reflective surfaces to the radius of said element are at most about 1:5.

4. The reflecting system of claim 1, wherein the ratios of the radii of at least some of said reflective surfaces to the radius of said element are between 1:10 and 1:100.

5. The reflecting system of claim 1, wherein said element has a diameter of about 0.25 to 10 millimeters.

6. The reflecting system of claim 5, wherein said diameter is about 0.4 to 2 millimeters.

7. The reflecting system of claim 1; further comprising a plurality of substantially transparent, substantially spherical elements arranged about said surrounded portion of said element; and wherein at least some of said reflective surfaces are constituted by reflective material arranged substantially concentrically with at least some of said plurality of elements.

8. The reflecting system of claim 7, wherein at least some of said plurality of elements have a refractive index of at least 1.9.

9. The reflecting system of claim 7, wherein said reflective material is in the form of coatings provided on said some of said plurality of elements; and further comprising additional substantially transparent, substantially spherical elements at least partially embedded in said binding medium and arranged so that interspaces are formed between adjacent ones of the same, at least some of said coated elements being arranged in said interspaces.

10. The reflecting system of claim 9, wherein the ratio of the radii of at least some of said additional elements to the radii of at least some of said coated elements are between about 10:1 and 100:1.

11. The reflecting system of claim 7, wherein at least some of said plurality of elements are composed of glass.

12. The reflecting system of claim 1, wherein at least some of said reflective surfaces comprise bowls formed in said binding medium and a layer of said binding medium separates said bowls from said element by a predetermined distance.

* * * * *